March 8, 1938.   J. H. REILLY   2,110,174
METHOD OF MAKING CARBON TETRACHLORIDE
Filed Dec. 2, 1935
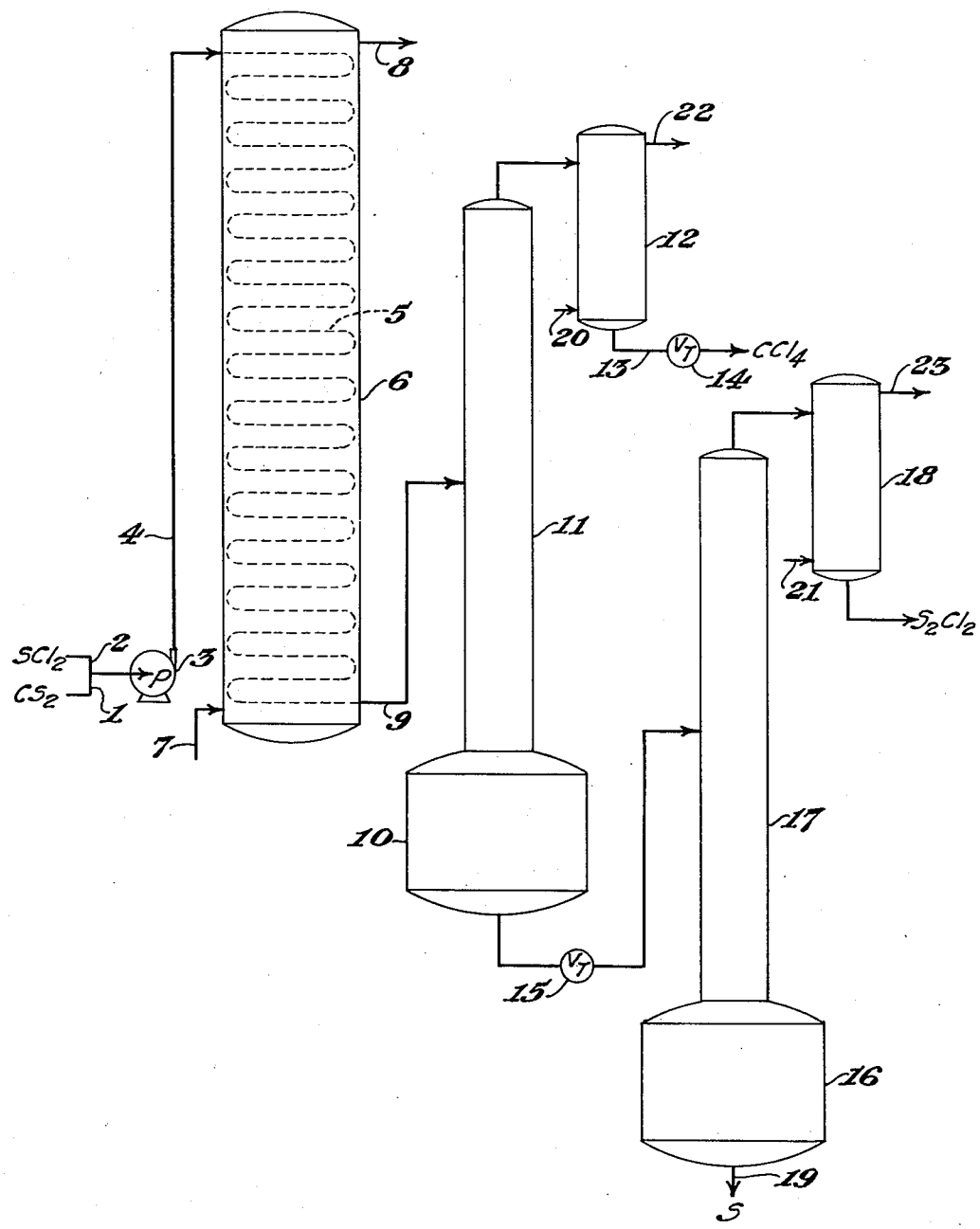
INVENTOR
John H. Reilly
BY
Thomas Griswold Jr. & E. C. Burdick
ATTORNEYS Patented Mar. 8, 1938

2,110,174

UNITED STATES PATENT OFFICE 2,110,174

METHOD OF MAKING CARBON TETRA-CHLORIDE

John H. Reilly, Midland, Mich., assignor to The Dow Chemical Company, Midland, Mich., a corporation of Michigan Application December 2, 1935, Serial No. 52,462

13 Claims. (Cl. 260—163)

It is well known that carbon tetrachloride is formed by reaction of carbon bisulphide and sulphur chlorides, either the monochloride or dichloride, in the presence of a catalyst such as iron chloride or antimony chloride, in accordance with the theoretical equations:

(1) 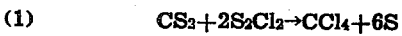 $CS_2 + 2S_2Cl_2 \rightarrow CCl_4 + 6S$ (2) 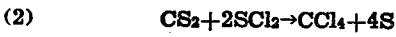 $CS_2 + 2SCl_2 \rightarrow CCl_4 + 4S$ It is also known that the reaction does not go to completion, however, and is in fact a reversible reaction which reaches a state of equilibrium, varying with conditions, so that the end product always contains more or less carbon bisulphide and sulphur chloride.

Up to the present time in all commercial processes of which I am aware, the process has been carried out as a batch operation, yielding a carbon tetrachloride product which is accompanied by considerable amounts of carbon bisulphide and sulphur mono-chloride, $S_2Cl_2$. The purification of such product is a tedious and difficult operation, owing especially to the fact that carbon bisulphide can be separated from carbon tetrachloride by distillation in the presence of sulphur and sulphur monochloride only with extreme difficulty, several distillations being necessary to obtain a commercial grade of carbon tetrachloride. Various chemical methods have been proposed for removing the last traces of carbon bisulphide, so as to yield a carbon tetrachloride of high purity. The numerous steps heretofore required for the purification of the crude reaction product have contributed materially to the cost of manfacture.

It is among the objects of the present invention to avoid conditions permitting a reversal of the principal reaction, and to produce a higher yield of carbon tetrachloride. A particular object is to obtain a reaction product substantially free from carbon bisulphide, thus avoiding the difficulties of purifying the product that have existed in previous processes. Another object is to provide a continuous method of operation. Other objects and advantages will appear as the description proceeds. The invention, then, consists in the improved procedure hereinafter fully described in the annexed drawing and accompanying specification, and particularly pointed out in the claims.

In said annexed drawing, the single figure is a diagrammatic representation of a combination of apparatus adapted for carrying out the invention.

I have found that by carrying out the reaction of carbon bisulphide with an excess over the stoichiometrical proportion of sulphur chloride under a pressure of about 1½ atmospheres or more the carbon bisulphide can be completely reacted so that the necessity of separating residual carbon bisulphide from the carbon tetrachloride product is eliminated. I have found further that a reversal of the reaction is prevented by distilling the carbon tetrachloride from the reaction product under a similar pressure. The improved method can be carried out in various ways. For example, the principal reaction can be conducted under a pressure of 1½ atmospheres or more and the carbon tetrachloride product distilled from the mixture without release of pressure. In another modification the principal reaction may be carried out at about normal pressure, and the product thereof then heated under higher pressure to complete the reaction, the carbon tetrachloride being distilled from the mixture under pressure, either coincidentally with such further heating, or subsequently thereto.

In a preferred embodiment of the invention a mixture of carbon bisulphide and an excess over the theoretical proportion of sulphur chloride, most advantageously the dichloride, is pumped under moderate pressure, i. e. 1.5 to 10 atmospheres, through a tubular reaction coil of suitable length, for which an iron or steel pipe is best adapted, since the iron supplies the catalyst for the reaction. The mixture at first may be slightly warmed to initiate the reaction, which then proceeds exothermically with evolution of considerable heat. Such heat is controlled by suitable cooling, so that the average temperature of the reaction mixture is maintained between about 40° and about 150° C. The reaction product, while still under pressure, is discharged into a still, and distilled under pressure to separate carbon tetrachloride from the residual sulphur and sulphur chloride. In this way the carbon bisulphide may be completely reacted, so that the separated carbon tetrachloride is substantially free from any traces thereof. It can then be finally purified by redistillation over lime or other alkali, in the usual manner.

The steps which I perform in carrying out my improved method for making carbon terachloride can best be described by reference to the annexed drawing. In the single figure, the raw materials for the process, i. e. carbon bisulphide and sulphur dichloride, are drawn from suitable sources through pipes 1 and 2, respectively, to a pump 3, which forces the reaction mixture through a pipe 4 into the coil reactor 5, preferably of iron or steel, under a pressure varying between 1½ and 10 atmospheres. An excess of sulphur dichloride over the theoretical proportions as shown in Equation (2) is normally fed into the reactor coil, preferably in quantity corresponding to about a 50 per cent excess thereof, to cause reaction to proceed approximately according to the following equation:

(3) $\quad CS_2 + 3SCl_2 \rightarrow CCl_4 + S_2Cl_2 + 3S$

The reactor coil 5 is disposed in a tank 6, through which a temperature regulating liquid such as oil or water, is circulated via an inlet 7 and an outlet 8, the temperature and rate of flow of the liquid medium being such as to maintain the temperature of the reaction mixture in the coil 5 between about 40° C. and about 150° C. The reaction product from the coil 5 flows through a pipe 9 to the column 11 of a continuous pressure still 10. From this still 10 carbon tetrachloride is vaporized under pressure corresponding to that in reactor 5, and the vapors pass off into a condenser 12, through which cold water is circulated via an inlet 20 and an outlet 22, wherein the carbon tetrachloride is condensed and drawn off through a pipe 13 and a throttle valve 14 to storage. The residue from the pressure still 10, consisting of sulphur monochloride and free sulphur, flows through a throttle valve 15 to a column 17 of a still 16 operated at atmospheric pressure or perferably under vacuum. Sulphur monochloride vapors pass over from the still 16 into a condenser 18, through which water is circulated via an inlet 21 and an outlet 23, wherein the monochloride condenses and may be drawn off. The sulphur monochloride recovered may be reacted with chlorine to give sulphur dichloride, which is then returned to the first reactor. The free sulphur, in a molten condition, is tapped off from the bottom of the still 16 through a pipe 19.

Although, as above stated, an approximately 50 per cent excess of sulphur dichloride is preferred for carrying out the process, either a larger or smaller excess thereof may be used, if desired. The larger the excess of sulphur dichloride, up to a ratio of 6 moles thereof to 1 mole of carbon bisulphide, the greater the proportion of sulphur monochloride to sulphur in the product, as shown by the equations:

(4) $\quad CS_2 + 4SCl_2 \rightarrow CCl_4 + 2S_2Cl_2 + 2S$ (5) $\quad CS_2 + 5SCl_2 \rightarrow CCl_4 + 3S_2Cl_2 + S$ (6) $\quad CS_2 + 6SCl_2 \rightarrow CCl_4 + 4S_2Cl_2$ The products of the process are, therefore, carbon tetrachloride free from carbon bisulphide, sulphur monochloride, and sulphur, the proportion of sulphur monochloride increasing with the excess of sulphur dichloride employed, while that of sulphur decreases. If it is desired to make sulphur monochloride as an additional product, it may be advantageous to increase the excess of sulphur dichloride, over that called for by Equation (2), to as much as 4 moles, i. e. an excess of 200 per cent (Equation 6).

When it is desired to employ sulphur monochloride as a starting material, in accordance with Equation (1), the method is similar to that just described and the reactants are advantageously employed in the proportions of about two to three moles of sulphur monochloride to one mole of carbon bisulphide.

The following example is illustrative of the results obtained by the present invention, but is not to be construed as limiting the same.

*Example*

Over a period of three hours 4543 grams of carbon disulphide and 18,460 grams of sulphur dichloride were introduced under pressure, at a substantially uniform rate, into a reactor consisting of a coil of 0.54 inch i. d. extra heavy iron pipe 30 feet long placed in a water bath. The flow of cooling water around the reactor coil was maintained at a rate such as to give reaction temperatures from 50° C. at the start of the run to 70° C. at the finish, while the pressure within the reactor ranged from 1½ to 2½ atmospheres. The reaction products passed continuously from the reactor to a continuous column still maintained under pressure, and carbon tetrachloride was distilled therefrom. The still residue was continuously withdrawn and throttled into a second still operated at atmospheric pressure in which sulphur monochloride was distilled from the free sulphur at a temperature of about 140° C., and the latter withdrawn as molten sulphur. There was obtained 9115 grams of carbon tetrachloride, or a yield of better than 99 per cent of theoretical. Analysis showed that the carbon tetrachloride contained less than one-tenth of one per cent of carbon bisulphide.

By means of our improved method carbon tetrachloride of excellent purity is produced in two steps involving one distillation, and the difficult separation of carbon bisulphide from the product, which has been a disadvantage of prior processes, is avoided. The yield is practically theoretical and a considerable reduction in the number of operating steps and in the apparatus required is obtained, compared with present commercial practice.

Other modes of applying the principle of my invention may be employed instead of those explained, change being made as regards the method herein disclosed, provided the steps stated by any of the following claims or the equivalent of such stated steps be employed.

I therefore particularly point out and distinctly claim as my invention:—

1. The method for the production of carbon tetrachloride which comprises reacting carbon bisulphide with sulphur chloride under super-atmospheric pressure of at least 1½ atmospheres.

2. The method for the production of carbon tetrachloride which comprises reacting carbon bisulphide with sulphur chloride under super-atmospheric pressure of at least 1½ atmospheres at a temperature between about 40° and 150° C.

3. In a method for the production of carbon tetrachloride, the steps which consist in reacting carbon bisulphide with sulphur chloride under super-atmospheric pressure of at least 1½ atmospheres and distilling carbon tetrachloride from the reaction product under similar pressure.

4. In a method for the production of carbon tetrachloride, the step which consists in feeding carbon bisulphide and an excess of sulphur chloride simultaneously into a reaction chamber maintained under super-atmospheric pressure of at least 1½ atmospheres, while maintaining the mixture at a temperature between 40° and 150° C.

5. In a method for the production of carbon tetrachloride, the step which consists in feeding carbon bisulphide and an excess of sulphur dichloride simultaneously into a reaction chamber under a pressure between about 1½ atmospheres and about 10 atmospheres, while maintaining the mixture at a temperature between 40° and 150° C.

6. In a method for the production of carbon tetrachloride, the step which consists in reacting carbon bisulphide with sulphur dichloride at a temperature between about 40° and about 150° C., under a pressure between about 1½ atmospheres and about 10 atmospheres.

7. In a method for the production of carbon tetrachloride, the step which consists in reacting carbon bisulphide with sulphur dichloride at a temperature between about 40° and about 150° C., under a pressure between about 1½ atmospheres and about 10 atmospheres, and distilling the carbon tetrachloride so formed from the reaction product at a similar pressure.

8. In a method for the production of carbon tetrachloride, the step which consists in reacting 1 molecular equivalent of carbon bisulphide with about 3 molecular equivalents of sulphur dichloride at a temperature between about 40° and about 150° C., under a pressure between about 1½ atmospheres and about 10 atmospheres, and distilling the carbon tetrachloride so formed from the reaction product at a similar pressure.

9. In a method for the production of carbon tetrachloride, the steps which consist in continuously forcing a mixture of carbon bisulphide and an excess of sulphur chloride through an elongated tubular reactor while maintaining the mixture under super-atmospheric pressure of at least 1½ atmospheres and at a temperature between about 40° and 150° C. and discharging the reaction mixture into a still without release of pressure and, while maintaining such pressure, distilling carbon tetrachloride therefrom.

10. In a method for the production of carbon tetrachloride, the steps which consist in continuously forcing a mixture of carbon bisulphide and an excess of sulphur dichloride through an elongated tubular reactor under a pressure between 1½ and 10 atmospheres while maintaining the mixture at a temperature between about 40° and 150° C., and discharging the reaction mixture into a still without release of pressure and distilling the same under similar pressure to separate carbon tetrachloride.

11. In a method for the production of carbon tetrachloride by reacting sulphur chloride and carbon bisulphide, the step which consists in fractionally distilling carbon tetrachloride from the reaction mixture under a super-atmospheric pressure of at least 1½ atmospheric.

12. In a method for the production of carbon tetrachloride, the steps which consist in reacting carbon bisulphide and an excess of sulphur chloride over the stoichiometrical proportion, such reaction being completed by applying to the reaction mixture a pressure of at least 1½ atmospheres, and distilling carbon tetrachloride therefrom under a similar pressure.

13. In a method for the production of carbon tetrachloride, the steps which consist in reacting carbon bisulphide and an excess of sulphur chloride over the stoichiometrical proportion, and distilling the reaction mixture under pressure of at least 1½ atmospheres to separate carbon tetrachloride therefrom.

JOHN H. REILLY.